Dec. 25, 1928.
B. W. KENDALL
REPEATER
Filed Jan. 23, 1919
1,696,241
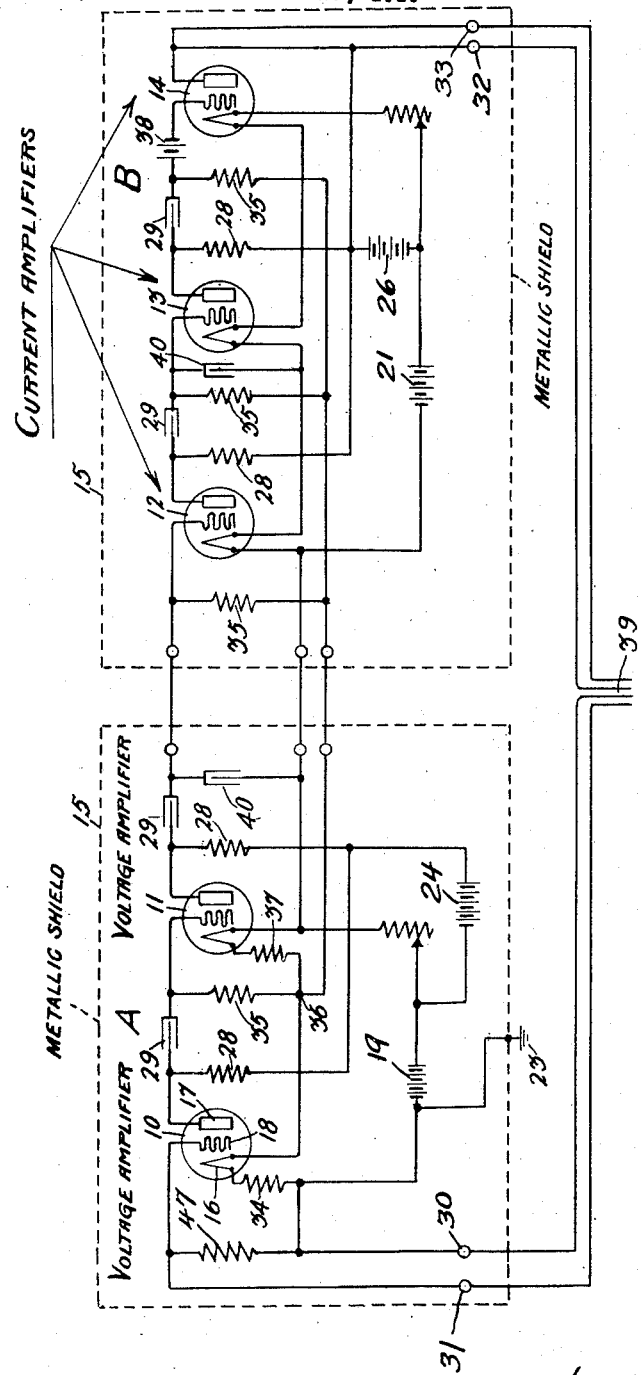
Inventor:
Burton W. Kendall
by J. S. Roberts
Atty.

Patented Dec. 25, 1928.

1,696,241

UNITED STATES PATENT OFFICE.

BURTON W. KENDALL, OF NEW YORK, N. Y., ASSIGNOR TO WESTERN ELECTRIC COMPANY, INCORPORATED, OF NEW YORK, N. Y., A CORPORATION OF NEW YORK.

REPEATER.

Application filed January 23, 1919. Serial No. 272,627.

This invention relates to repeaters for electric impulses and more particularly to a method and means for preventing the transmission through the repeater of impulses having undesirable frequencies.

A specific object of the invention is to provide means for substantially extinguishing high frequency impulses, such as may be produced within the repeater by the so-called singing thereof, or may be produced by extraneous causes in the incoming line.

This object is attained in the form of the invention shown herein, wherein it is embodied in a multi-stage vacuum tube repeater or amplifier, by connecting across the circuit of one or more of the vacuum tubes a condenser of such capacity that it offers an easy path or practically a short circuit for impulses having frequencies above a predetermined value but offers high or nearly infinite impedance to impulses having frequencies below such value. The latter impulses only are transmitted through the succeeding tube or outgoing line.

The invention will be more fully understood from the following detailed description and claims taken in connection with the accompanying drawing, in which is shown a five stage vacuum tube amplifier embodying the invention.

Referring to the drawing, the vacuum tubes 10, 11, 12, 13 and 14 are arranged in tandem for successive amplification of the incoming signals. For convenience in assembling the set, it is divided into two sections A and B, comprising the first two and the last three tubes respectively, and each section is enclosed in a metallic shield shown in dotted lines at 15.

Each of the tubes has the usual cathode 16, anode 17, and control electrode 18. It may be stated here that the first two or three tubes are preferably of a voltage amplifying type, while the last two or three are of a current amplifying type, an arrangement which is disclosed in the United States patent to H. D. Arnold, No. 1,129,942, dated March 2, 1915. This arrangement renders the repeater very desirable for use in connection with submarine cables where the feeble incoming signals should not be subjected to the distorting influence of a step-up transformer. The present invention, however, is not limited to the arrangement shown and described, but is of utility when applied to various types of repeaters, both single and multi-stage.

The cathodes of tubes 10 and 11 are heated by current from a source indicated as a battery 19 and the cathodes of tubes 12, 13 and 14 by current from a source indicated as a battery 21. The negative end of battery 19 may be grounded as shown at 23. The battery or other source 24 is provided for supplying space current for the first two tubes and source 26 serves a similar purpose for the last three tubes. Impedances shown here as being in the form of ohmic resistances 28, are placed between the anodes of tubes 10, 11, 12 and 13 and the source of space current, and changes in potential differences across each of these impedances are impressed on the grid of the succeeding tube through a connection including the condenser 29. The incoming line may be connected in any desired manner to the cathode and control electrode of tube 10. As shown, it is directly connected to the terminals 30 and 31, resistance 47 providing a direct path between the input electrodes. In a similar manner the outgoing line is connected to the output terminals 32 and 33.

As is well known, it is desirable in amplifiers of this type to maintain the control electrode at a negative potential with respect to the cathode. In the present arrangement, the source of heating current for the cathodes of the tubes in section A is made use of for this purpose. The control electrode of tube 10 is negative with respect to the corresponding cathode by the potential drop across resistance 34. The control electrodes of the other four tubes are connected through resistances 35 to the point 36 in advance of the resistance 37. By this arrangement the potential difference between control electrode and cathode becomes increasingly greater in the successive tubes, by reason of the fact that the drop across the cathode of the preceding tube is added with each advance to the negative potential of the preceding control electrode. In the case of the last tube 14, wherein the amplitude of the incoming signals is relatively large, this potential difference is made still greater by the use of battery 38.

The operation of an amplifier of this type is well understood in the art and need not be described in detail. Impulses received from the incoming line are successively amplified and transmitted to the outgoing line. If the incoming line be a submarine cable, for example, high frequency variations may be set up in the current, on account of capacity effects between the wires. These interfere with the clearness of the signals at the receiving or recording station. Another cause of undesirable high frequency variations in the current may be a singing condition of the repeater. One way in which this condition may be set up is by reason of capacity effects between the incoming and outgoing lines, which may occur in a variety of possible arrangements. One such arrangement is indicated in the drawings at 39. Where the amplification of the repeater set is great, the amplified impulses may be fed back to the input circuit through the capacity between the wires and thus set up continuous oscillations or singing. Also if the amplifier be used as one branch of a two-way repeater for low frequency signals, a singing condition might arise in case of inaccurate balancing of the artificial lines with the real lines.

To prevent the transmission of high frequency variations of the above character, this invention comprises the provision of one or more condensers 40 of small capacity shunted across the output circuits of one or more of the vacuum tubes. As shown in the drawing, such a condenser is connected across the output circuit of tube 11 and another across the output circuit of tube 12, but it is to be understood that either condenser alone could be used with satisfactory operation, or a condenser could be placed across the output or input circuit of any one of the five tubes, or any combination of condensers in these positions. If condensers be used with more than one tube a sharper discrimination against undesirable frequencies may be had.

A condenser is chosen having such a capacity with relation to the impedance of the load, which in this case includes the resistance 35 and the space between the cathode and control electrode within the tube, that the condenser will act substantially as a short circuit for frequencies much above the value of the frequencies which it is desired to transmit. A repeater which was tried out was found to operate efficiently for the amplification of telegraph signals, when a single condenser having a capacity of 500 M. M. F. was used in shunt to the second tube and the value of the corresponding resistance 35 was one megohm.

While one embodiment of the invention has been illustrated and described, it is clear that the invention may be applied to various arrangements and circuits and is limited only by the scope of the following claims.

What is claimed is:

1. The combination of two vacuum tubes each having a cathode, an anode and a control electrode, a connection from the anode of one of said tubes to the control electrode of the other of said tubes, a connection between the cathodes of said tubes, and a condenser of small capacity connected between said connections.

2. The combination of two vacuum tubes each having a cathode, an anode and a control electrode, a connection from the anode of one of said tubes to the control electrode of the other of said tubes, a connection between the cathodes of said tubes, a condenser of small capacity connected between said connections, a source of space current in circuit with the cathode and anode of said first tube, and an impedance between said source and said anode.

3. In combination, a plurality of vacuum tube repeaters arranged in tandem, each having an input circuit and an output circuit, coupling means tending to cause a feedback of energy from the output circuit of one of said tubes to the input circuit of a previous tube, and condensers of small capacity connected in shunt to the output circuits of at least two of said tubes respectively for preventing a circulation of energy due to said feed-back.

4. The method of operating an amplifier circuit which comprises arranging the input lines of said amplifier in close proximity to the output lines thereof, whereby said amplifier tends to generate oscillations of a frequency different from those to be repeated and amplified, and in suppressing said oscillations.

5. The method of operating an amplifier circuit which comprises arranging the input lines of said amplifier in close proximity to the output lines thereof, whereby said amplifier tends to generate oscillations of a frequency different from those to be repeated and amplified, and in short circuiting oscillations which tend to produce said generation.

6. The combination of a repeater for electric impulses, incoming and outgoing lines connected thereto and arranged in proximity to each other for a portion of their length sufficient to produce an appreciable mutual transfer of electrical energy between said lines, and means to prevent the transmission to said outgoing line of impulses having a frequency above a predetermined value.

7. The combination of a repeater for electric impulses, incoming and outgoing lines connected thereto, said incoming and outgoing lines being arranged in proximity to each other for a portion of their length, and means including a condenser for short circuiting oscillations above the signal frequency which may tend to be set up.

8. The method of operating an amplifier circuit which comprises arranging the input lines of said amplifier in close proximity to the output lines thereof, whereby said amplifier tends to generate oscillations and in suppressing said oscillations.

9. An audio receiving apparatus having a plurality of thermionic amplifiers and an input and an output, and means in the filament-grid circuits of said amplifiers for preventing undesired, amplified and audible internal oscillations from affecting said output.

10. An audio receiving apparatus having a plurality of thermionic amplifiers and an input and an output, and means in said apparatus for preventing undesired, amplified and audible internal oscillations from affecting said output.

In witness whereof, I hereunto subscribe my name this 15th day of January, A. D., 1919.

BURTON W. KENDALL.